United States Patent
Shinohara

[11] Patent Number: 5,877,769
[45] Date of Patent: Mar. 2, 1999

[54] IMAGE PROCESSING APPARATUS AND METHOD

[75] Inventor: Mikio Shinohara, Tokyo, Japan

[73] Assignee: Sega Enterprises, Ltd., Tokyo, Japan

[21] Appl. No.: 864,679

[22] Filed: May 28, 1997

[30] Foreign Application Priority Data

Jun. 3, 1996 [JP] Japan .................................. 8-140259

[51] Int. Cl.$^6$ .................................................. G06T 15/00
[52] U.S. Cl. .......................... 345/425; 345/427; 345/430
[58] Field of Search .................................... 345/430, 425, 345/426, 421, 429

[56] References Cited

U.S. PATENT DOCUMENTS 5,446,833  8/1995  Miller et al. ............................. 345/425
5,748,194  5/1998  Chen ........................................ 345/427

Primary Examiner—Mark K. Zimmerman
Assistant Examiner—Huedung X. Cao
Attorney, Agent, or Firm—Dickstein Shapiro Morin & Oshinsky LLP

[57] ABSTRACT

The present invention relates to a image processing apparatus and the method thereof which can change image to be shown on a reflection surface of an object. The image processing apparatus for generating image data to be displayed on a predetermined display screen, comprises: a processor for performing a filling process of filling a polygon to generate image data based on positional information of said polygon on two-dimensional coordinates corresponding to said display screen and texture data associated with said polygon; a frame buffer memory for storing the image data corresponding to said display screen; and a reflection map memory for storing image data to be shown on a reflection surface in said display screen, wherein said processor generates said image data to be shown on said reflection surface based on viewpoint information corresponding to said reflection surface and positional information of a polygon which lies in said reflection surface, stores said generated image data in said reflection map memory, and further generates said image data to be displayed on said display screen based on viewpoint information corresponding to the display screen, positional information of a polygon which lies in said display screen, and said image data in said reflection map memory.

9 Claims, 7 Drawing Sheets

IMAGE PROCESSING APPARATUS AND METHOD

BACKGROUND OF THE INVENTION

1. Field of the Invention

The present invention relates to an image processing apparatus using a computer, and, more particularly, to an image processing apparatus and method which can change an image to be shown on a reflection surface when this reflection surface is the surface of an object.

2. Description of the Related Art

Computer aided image processing techniques are used in simulation apparatuses, game machines and the like. Generally, simulations and games are provided by computer programs in such a manner that each object of an image or the viewpoint on the display is moved in accordance with the manipulation by an operator and the resultant image is displayed on a monitor TV or the like. In this case, the coordinates of objects and texture, such as the color and pattern of the surface of each object, which are acquired by computation performed by a computer program, are subjected to a rendering process (filling process) to obtain color data pixel by pixel, which is in turn written in a frame buffer memory. The pixel-by-pixel digital color data written in the frame buffer memory is converted to analog color data, which is then displayed on the monitor TV or the like.

When texture of the surface of an object is a reflection surface, the aforementioned rendering process can similarly directly be utilized by treating an image to be shown on that surface as one kind of texture data.

According to the conventional image processing, however, what is used for an image to be shown on such a reflection surface is merely image data simply drawn in a fixed form, and no attempts have been made to show even an object, which is changing or moving in real time by a computer program, on such a reflection surface. Even when the viewpoint is changing frame by frame, an image to be shown on a reflection surface does not change and thus appears unnatural. For pictures with scenes always changing as in a video game, therefore, it is desirable to produce an image to be shown, which changes in real time in accordance with the movement of a real image.

SUMMARY OF THE INVENTION

Accordingly, it is a primary objective of the present invention to provide an image processing apparatus and method capable of ensuring a real-time change in even an image, shown on the reflection surface of an object, with a simple structure.

It is another objective of the present invention to provide an image processing apparatus and method capable of ensuring a real-time change in even an image, shown on the reflection surface of an object, with a simple structure while making the good use of the structure which is associated with the conventional rendering process.

It is a further objective of the present invention to provide a game machine which can change, in real time, even an image, shown on the reflection surface of an object.

To achieve the above objectives, according to one aspect of this invention, there is provided an image processing apparatus for generating image data to be displayed on a predetermined display screen, which comprises:

- a processor for performing a filling process of filling a polygon to generate image data based on positional information of the polygon on two-dimensional coordinates corresponding to the display screen and texture data associated with the polygon;
- a frame buffer memory for storing the image data corresponding to the display screen; and
- a reflection map memory for storing the image data to be shown on a reflection surface in the display screen, wherein the processor generates the image data to be shown on the reflection surface based on viewpoint information corresponding to the reflection surface and positional information of a polygon which lies in the reflection surface, stores the generated image data in the reflection map memory, and further generates the image data to be displayed on the display screen based on viewpoint information corresponding to the display screen, positional information of a polygon which lies in the display screen, and the image data in the reflection map memory.

This image processing apparatus may further comprise:

- a texture map memory for storing texture data of each polygon; and
- a blending unit for blending image data in the texture map memory with image data in the reflection map memory by a predetermined ratio, wherein in generating the image data to be displayed on the display screen, image data acquired by blending the image data in the texture map memory with the image data in the reflection map memory is used as the texture data of each polygon in the filling process.

According to another aspect of this invention, there is provided an image processing method of generating image data to be displayed on a predetermined display screen, which comprises:

- a first step of performing perspective transformation of polygon positional information of a polygon to be shown on a reflection surface of a polygon to two-dimensional coordinates from three-dimensional coordinates based on the polygon positional information and viewpoint information with respect to the reflection surface to generate polygon positional information of the polygon on two-dimensional coordinates corresponding to the reflection surface;
- a second step of performing a filling process of filling the polygon, based on the polygon positional information generated in the first step and texture data associated with the polygon, to generate image data to be shown on the reflection surface;
- a third step of writing image data to be shown on the reflection surface in a reflection map memory;
- a fourth step of performing perspective transformation of polygon positional information of the polygon to be displayed on the display screen to two-dimensional coordinates from three-dimensional coordinates, based on that polygon positional information and viewpoint information with respect to the display screen, to generate polygon positional information of the polygon on two-dimensional coordinates corresponding to the display screen;
- a fifth step of performing a process of filling the polygon, based on the polygon positional information generated in the fourth step and image data of an area corresponding to the reflection surface in the reflection map memory, to generate the image data to be displayed on the display screen; and
- a sixth step of writing the image data to be displayed on the display screen, generated in the fifth step, in a frame buffer memory.

The above-described structure allows image data, which is shown on a reflection surface, to be generated in real time and stored in the reflection map memory. The image data on the display screen therefore includes the image on the reflection surface which changes in real time. The reflection map means a memory for recording a image data on reflection surface of polygon and has the same memory structure as the flame baffer.

According to this invention, data in the reflection map and the ordinary texture map are mixed and the resultant data is pasted as image data on the reflection surface. Therefore, the reflection map memory and the texture map memory are treated equally, and the image data in both memories are mixed by a proper predetermined ratio in the case of a reflection surface. The first processor, a geometry processor, and the second processor, a renderer processor, can execute image processing without much modification from the conventional types.

The positional information of a polygon is the vertex coordinates of the polygon or texture coordinates corresponding to the polygon, for example. The viewpoint information includes, for example, the positional coordinates of a viewpoint, the direction of the viewpoint and the angle of the field of view.

DETAILED DESCRIPTION OF THE PREFERRED EMBODIMENTS

A preferred embodiment of the present invention will now be described with reference to the accompanying drawings.

Basic Concept

Figure 1:
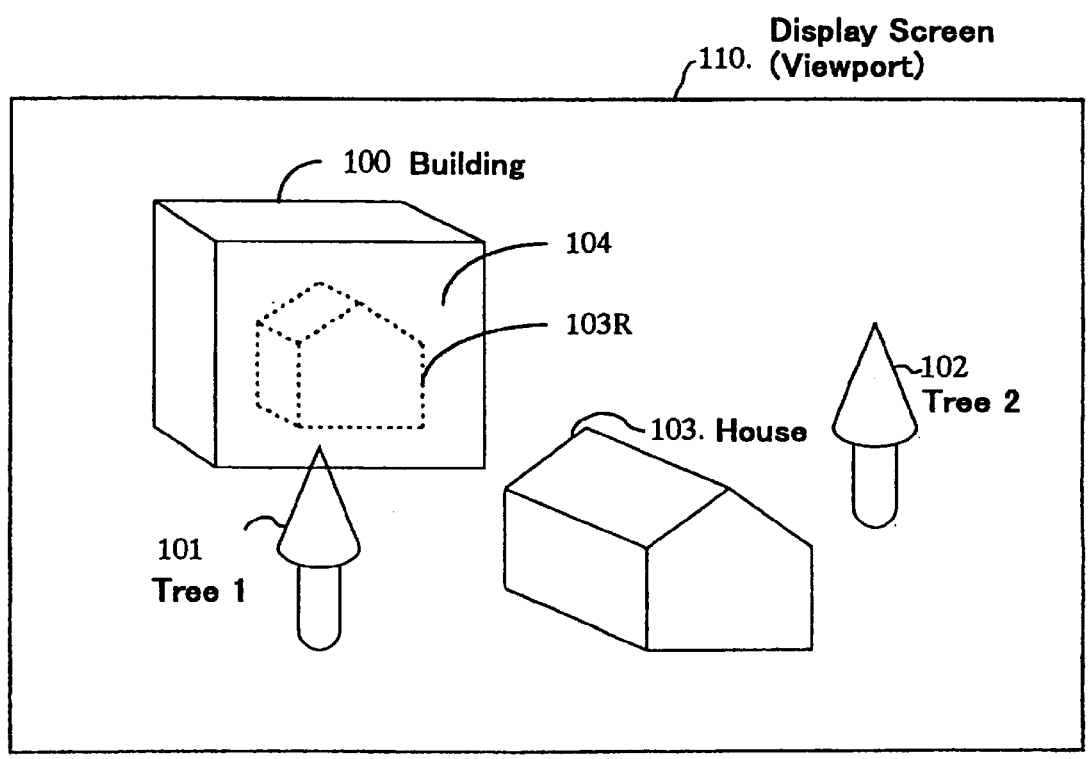
FIG. 1 is a diagram showing a structural example for explaining the basic concept.

FIG. 1 is a diagram showing a structural example for explaining the basic concept of one embodiment of this invention. In FIG. 1, a building object 100, tree objects 101 and 102 and a house object 103 are shown within a display screen 110, a view port, as one example. Suppose that of those objects, a front 104 of the building 100 is a reflection surface. Then, the house 103 is shown on the reflection surface 104 of the building 100 as exemplified in FIG. 1. If the house 103 moves in real time like a vehicle or a person, image processing is carried out in such a way that the vehicle or person shown on the reflection surface 104 moves too. If the viewpoint moves, image processing is performed in such a manner that an image which is shown on the reflection surface 104 accordingly changes in real time.

As will be specifically discussed later, each of those objects is broken down to polygonal elements called polygons which are in turn subjected to computer processing. Each polygon is given by polygon data including vertex coordinate in the three-dimensional coordinates system and texture data (an address in a texture map memory), for example, and is subjected to perspective transformation on the two-dimensional coordinates of the display screen in accordance with the position, direction and angle with respect to the viewpoint. The texture data designated to each transformed polygon is subjected to rendering. "Rendering" is a process of filling a polygon with a predetermined color. Specifically, the "rendering" process is to store texture data (or color data obtained by processing the texture data) for each pixel in a polygon which is defined by vertex data into a frame buffer memory 16 or a reflection map memory 14.

Figure 2:
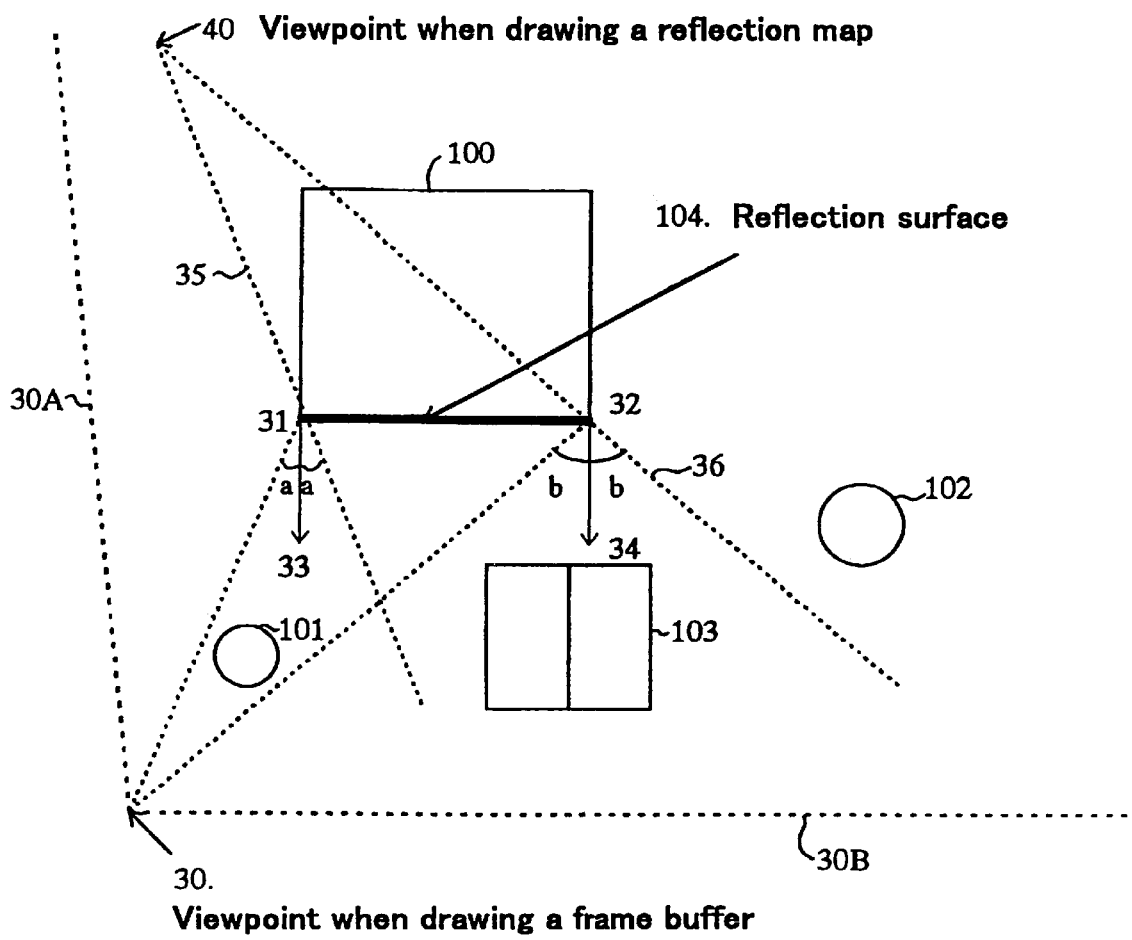
FIG. 2 is a diagram for explaining how to form a reflection map for a reflection surface in the image processing of an object in a display screen shown in FIG. 1.

FIG. 2 is a diagram for explaining how to form a reflection map for the reflection surface 104 in the image processing of an object in the display screen shown in FIG. 1. For the sake of simplicity, FIG. 2 shows the individual objects as looked down from above. A description will now be given of how to show the house object 103 on the front reflection surface 104 of the building 100.

Assume that the viewpoint with respect to the display screen 110 is at a position 30. The viewpoint 30 is for the case where final display data is drawn (written) in the frame buffer memory in which the display data is stored pixel by pixel. The direction and angle of view then exist in the area that is defined by broken lines 30A and 30B. First, let us consider normal vectors 33 and 34 at both end points 31 and 32 of the polygon 104 having the reflection surface (hereinafter referred to as "reflection surface polygon"). Normally, polygon data contains at least the coordinates of the vertexes that define a polygon and normal vectors thereof. In this respect, a reflection line 35 at the end point 31 which is defined by an angle a equal to the angle between the line extending from the viewpoint 30 to the point 31 and the normal vector 33. Likewise, a reflection line 36 at the end point 32 which is defined by an angle b equal to the angle between the line extending from the viewpoint 30 to the point 32 and the normal vector 36. The intersection, 40, between both reflection lines 35 and 36 becomes a viewpoint in the case where a reflection map is drawn. This viewpoint 40 is simply line symmetrical to the viewpoint 30 with respect to the reflection surface 104 when the reflection surface 104 is a plane.

An image which is shown in accordance with the directions from the viewpoint 40 to the reflection lines 35 and 36 is what is shown on the reflection surface polygon 104. With the viewpoint 40 and the reflection lines 35 and 36 as references, processing a polygon of an object lying in the view field can allow data of the image shown on the reflection surface polygon to be written in the reflection map through the same image processing technique as employed in the ordinary writing of image data like color data into the frame buffer memory. At this time, as will be discussed later, texture data for each pixel in each polygon is read from the texture map and is subjected to various processes like rendering so that image data of the foremost pixel in the view field is written in the reflection map memory.

Figure 3:
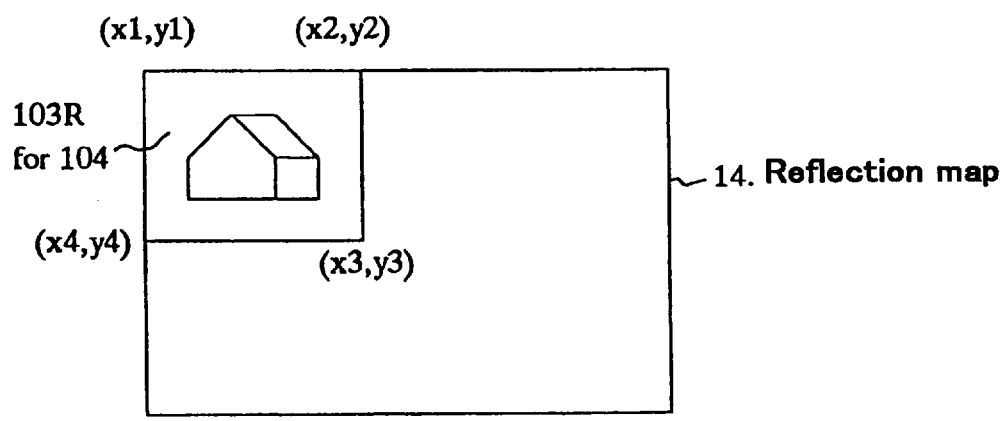
FIG. 3 is a diagram conceptually showing one example of the reflection map.

FIG. 3 conceptually shows one example of the reflection map (14). Reflection data 103R for the reflection surface 104 is written in the reflection map area. Its coordinates (x1, y1), (x2, y2), (x3, y3) and (x4, y4) correspond to the respective vertexes of the reflection surface polygon 104. In this example, the house 103 is shown as the reflection data 103R. Texture data for each pixel in the polygon 104 is acquired by associating the vertexes of the polygon 104 with the four coordinates in the reflection map memory with one another and computing intervals therebetween by interpolation. This is the same scheme as used in pasting data in the texture map.

As mentioned above, first, reflection data is written in the reflection map for each reflection surface polygon, then display data is drawn (written) in the frame buffer memory in accordance with the viewpoint 30 for the frame buffer memory while using the reflection map in the same as for the texture map. As those two processes are executed for each frame period, an image to be shown can be generated in real time for each reflection surface polygon. When the image to be shown moves, data writing in the reflection map is executed for an object after movement. When the viewpoint 30 moves, data writing in the reflection map is executed with respect to the viewpoint 40 for the reflection map based on the moved viewpoint 30.

Image Processing Apparatus And Flow

Figure 4:
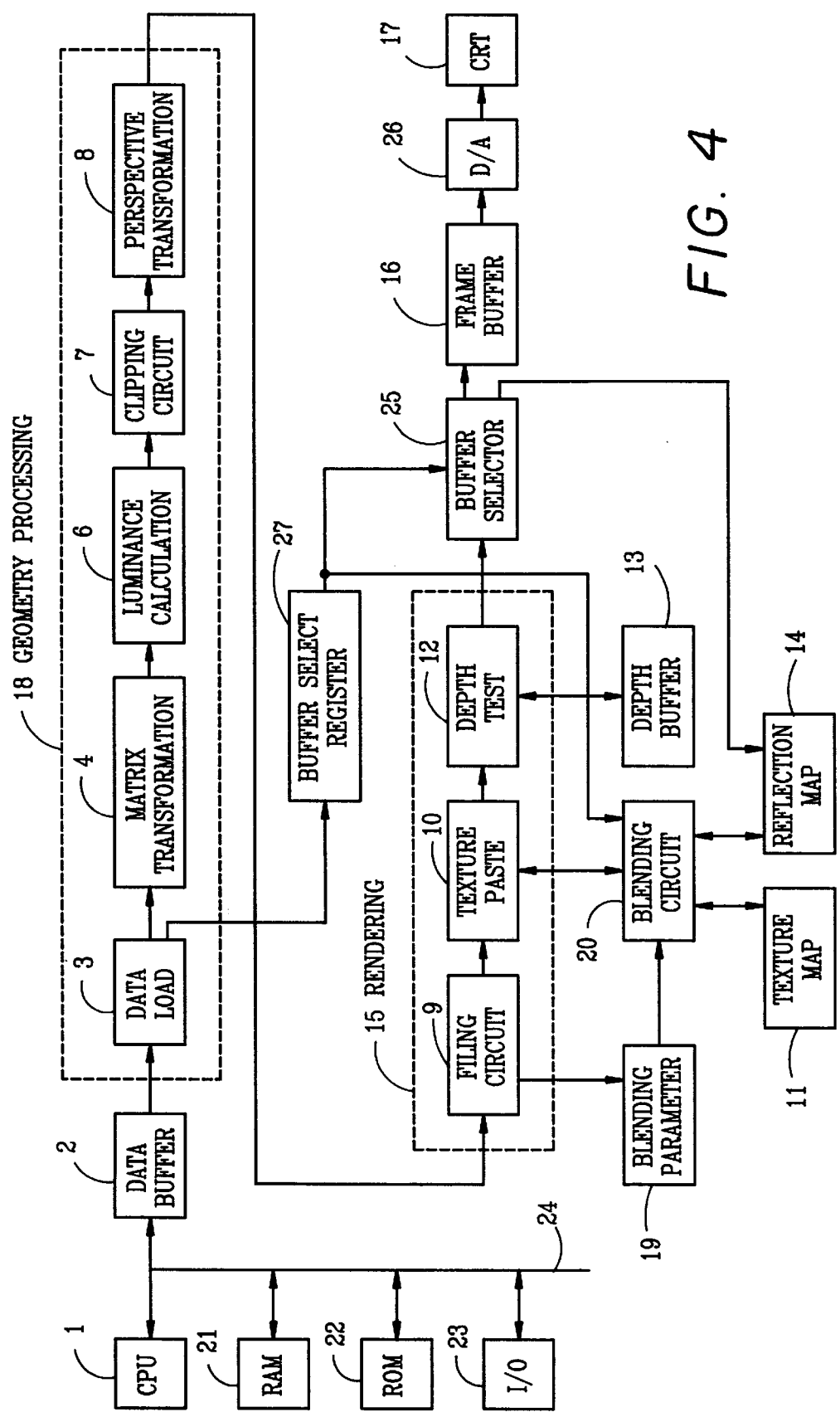
FIG. 4 is a block diagram of an image processing apparatus embodying this invention.
Figure 5:
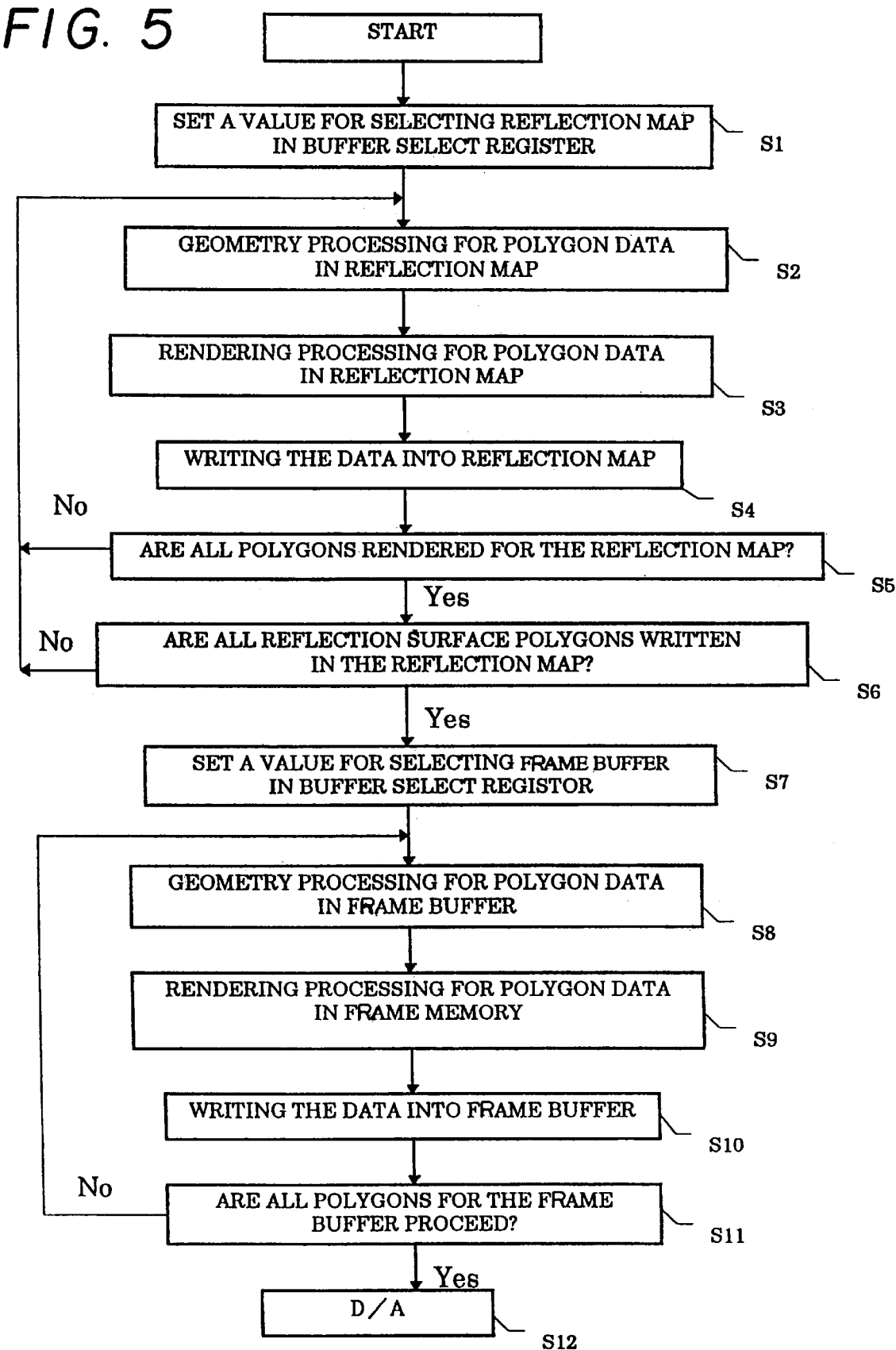
FIG. 5 is a flow chart of image processing according to one embodiment of this invention.

FIG. 4 is a block diagram of a specific image processing apparatus which realizes the above-described basic concept. FIG. 5 is a flow chart illustrating the image processing flow for this apparatus.

A CPU 1 runs a computer program for simulation, a game or the like, stored in a ROM 22 which is connected to the CPU via a bus 24. A RAM 21 is used in arithmetic operations executed by the program. Numeral "23" denotes an input/output section to which an input signal is given by a user. The CPU 1 gives vertex data of a polygon used for expressing a three-dimensional object to a data buffer 2 (step S1). Generally, the vertex data of a polygon includes at least attribute data, such as the coordinates (X, Y, Z) of each vertex, a vertex color (red, green, blue), texture coordinates (Tx, Ty), the perspective of each vertex and a normal vector. The CPU 1 further provides the data buffer 2 with a register set function, which is data including a matrix coefficient for the rotation of a polygon, parallel movement thereof or the like in the three-dimensional space. This register set function is used by a matrix transformation circuit 4 which will be discussed later.

The image processing apparatus in FIG. 4 mainly comprises a geometry processing section 18 for arranging polygons in the three-dimensional coordinate space from polygon data given from the CPU 1 and performing perspective transformation to the two-dimensional coordinate space in the display screen 110, and a rendering section 15 for reading texture data from a texture map memory 11 for each pixel in each polygon to generate image data containing color data and writing the image data in the reflection map memory 14 and buffer memory 16 with respect to the foremost pixel of the screen. The reflection map memory 14 where an image to be shown on the reflection surface polygon according to this invention is stored is provided as equal as the texture map memory 11. Further provided is a buffer selector 25 for switching between writing into the reflection map memory 14 and writing into the frame buffer memory 16.

The image processing flow in FIG. 5 illustrates the main process for completing one frame, and is repeated frame period by frame period. When the frame frequency is 60 Hz as in the NTSC system, for example, 60 frames are generated and displayed per second. That is, the flow in FIG. 5 is repeated every 1/60 second. This image processing flow is roughly separated to the first half portion (steps S1 to S6) for writing data of an image to be shown for the reflection surface polygon in the reflection map and the second half portion (steps S7 to S12) for writing display image data in the frame buffer memory 16 using the thus generated reflection map.

The following will describe how the image processing flow in FIG. 5 is performed using the image processing apparatus shown in FIG. 4. In the image processing apparatus in FIG. 4, vertex data of each polygon and the register set function stored in the data buffer 2 are read by a data loader 3 in accordance with the processing speed and are supplied to the matrix transformation circuit 4 as mentioned earlier.

First, a value for selecting the reflection map 14 is set in a buffer select register 27 in response to a command sent from the CPU 1 via the data loader 3. As a result, the buffer selector 25 connects to the reflection map 14, not the frame buffer memory 16 (step S1).

The matrix transformation circuit 4 lays out polygons in the three-dimensional space through matrix transformation according to the register set function and the vertex coordinates. Further, the matrix transformation circuit 4 sets a view port (display screen) for determining which area in the three-dimensional space is to be displayed in accordance with the viewpoint data that is given from the CPU 1. If the normal vector at each vertex is not given, the inclination of the plane of a polygon is computed from each vertex to calculate the normal vector at each vertex. A luminance calculating circuit 6 uses the normal vectors to compute the influence of the plane like reflection on the light source, and calculates the luminance of the plane through this computation.

A clipping circuit 7 performs processing, such as removing any vertex of a polygon which lies outside the view port of the display screen and defining a new vertex in the view port, thus establishing the polygon lying in the view port. Finally, a perspective transformation circuit 8 executes transformation of the three-dimensional coordinates to the two-dimensional coordinates on the display screen. Therefore, the output of the geometry processing section 18 contains the X and Y coordinates on the two-dimensional coordinate system for each vertex of a polygon, a value Z representing the depth of the polygon in the screen and the other attribute data mentioned above.

The processes of the circuits 3 to 8 are sequentially executed in accordance with the so-called pipeline control system in synchronism with the system clock. The above is a process in step S2.

Next, the rendering section 15 performs a geometry process on polygon data for the reflection map (step S3). The rendering section 15 comprises a filling circuit 9 which generates pixel data in a polygon on the display screen from the vertex data, a texture pasting circuit 10 which supplies texture data from the texture map memory 11 to those pixel data and a depth test circuit 12 which compares the Z values of pixels with one another to determine if the pixel of interest is the foremost one on the display screen.

The filling circuit 9 generates data on the pixels in a polygon defined by vertexes from the vertex coordinates transformed to the two-dimensional coordinates. One example of the pixel data includes the coordinates (x, y) of a pixel, the Z value indicating the depth, texture coordinates (tx, ty) and color data. Pixel-by-pixel data is acquired from the vertex data of a polygon by interpolation or the like. This data is supplied to the texture pasting circuit 10 pixel by pixel. Thereafter, pixel-by-pixel data processing is executed in the pipeline system.

The texture pasting circuit 10 read texture data from the texture map memory 11 in accordance with the texture coordinates in the pixel data, acquires texture data (a kind of color data) to be pasted through calculation as needed when a plurality of textures correspond to a single pixel, for example, and affixes the texture data as the attribute data of the pixel data.

Next, the depth test circuit 12 compares the Z value of a pixel being processed with the known Z value of the pixel at the corresponding position in the depth buffer memory 13. When the Z value of the pixel being processed is smaller, that Z value is written in the depth buffer memory 13. Accordingly, the Z value of the foremost pixel on the screen is stored in the depth buffer memory 13 and when a pixel lying top of the foremost pixel is to be processed, the stored Z value is replaced with its new Z value.

At the same time as data is written in the depth buffer memory 13, image data containing color data of that pixel is written in the reflection map memory 14 (step S4). As apparent from the above, the depth buffer memory 13 is used to determine whether or not the image data of the pixel being processed should be written in the frame buffer memory 16. As the reflection map for the reflection surface polygon 104 is generated here, the Z value of the foremost pixel in the reflection surface 104 is stored. Therefore, the depth buffer memory 13 may comprise a first depth buffer memory for the reflection map and a second depth buffer memory for the flame buffer memory.

The steps S2, S3 and S4 are repeated until processing for every polygon to be written in the reflection map 14 is completed (step S5). When data writing in the reflection map 14 for one reflection surface polygon is completed, similar data writing is executed for the next reflection surface polygon. That is, steps S2–S5 are repeated for all the reflection surface polygons (step S6).

When the generation of the reflection map 14 for all the reflection surface polygons is completed, image data is written in the frame buffer memory 16. The viewpoint is therefore changed to "30" from "40." First, a value for selecting the frame buffer memory 16 is set in the buffer select register 27 in response to a command sent from the CPU 1 (step S7). As a result, the buffer selector 25 is switched to frame buffer memory 16. Further, the function of a blending circuit 20 to blend data in the texture map memory 11 and the reflection map memory 14 is rendered active in accordance with the value set in a blend parameter register 19.

The processing in the geometry processing section 18 is the same as the one performed in the case of writing data in the reflection map (step S8), and is executed as follows. The vertex data for a polygon which lies in the view field from the viewpoint 30 and the register set function are supplied to the data buffer 2 from the CPU 1. The data loader 3 sequentially reads those vertex data and register set function and gives them to the matrix transformation circuit 4. The matrix transformation circuit 4 performs the layout of polygons in the three-dimensional coordinate system, and executes computation of the luminance, the clipping process and the perspective transformation to the two-dimensional coordinates in the respective circuits 6, 7 and 8 in the same manners as discussed above.

Next, the rendering section 15 performs processing, such as coloring of a polygon, shading and texture pasting (step S9). This process differs from the process in step S3 for generating the reflection map 14 in that the data in the texture map memory 11 and the reflection map memory 14 are blended and the resultant data is pasted as the image data of the pixel. The degree of blending is determined in accordance with the attribute data which indicates the reflectance given to each pixel when pixel data is generated by the filling circuit 9. Specifically, the filling circuit 9 sets the blending degree in the blend parameter register 19 in accordance with the reflectance.

In the case of a polygon of a lattice window, for example, data such as the lattice pattern and the color of the window is read from the texture map 11. If the reflectance is high, data read from the reflection map 14 is blended with the texture data with a high weight. If the reflectance is low, on the other hand, blending is done with a low weight.

Therefore, the pixel data generated by the filling circuit 9 includes the two-dimensional coordinates (x, y) of the screen, the Z value, an address in the texture map memory, an address in the reflection map memory, the reflectance and color information.

After the texture data is pasted to a pixel by the texture pasting circuit 10, the comparison of the Z values is performed by the depth test circuit 12. When the pixel is located foremost on the screen, its texture data is written as image data in the frame buffer memory 16 (step S10). The buffer selector 25 is currently switched to the frame buffer memory 16. The Z value is written in the depth buffer memory 13 at the same time as the writing of the texture data in the frame buffer memory 16.

Those steps S8 to S10 are performed for every polygon to be written in the frame buffer memory 16 (step S11), and finally a D/A converter 26 converts image data (color data) for each pixel in the frame buffer memory 16 to an analog value which is in turn supplied to a display device 17 like CRT. If the display device 17 is a liquid crystal display device which is capable of processing digital data, the image data is supplied as digital data to the display device 17.

Case Of Curved Reflection Surface Polygon

As the above has discussed the case where a reflection surface polygon is a plane, the case where a reflection surface polygon has a curved surface will now be discussed. Suppose that the building 100 shown in FIG. 1 has a columnar shape.

Figure 6:
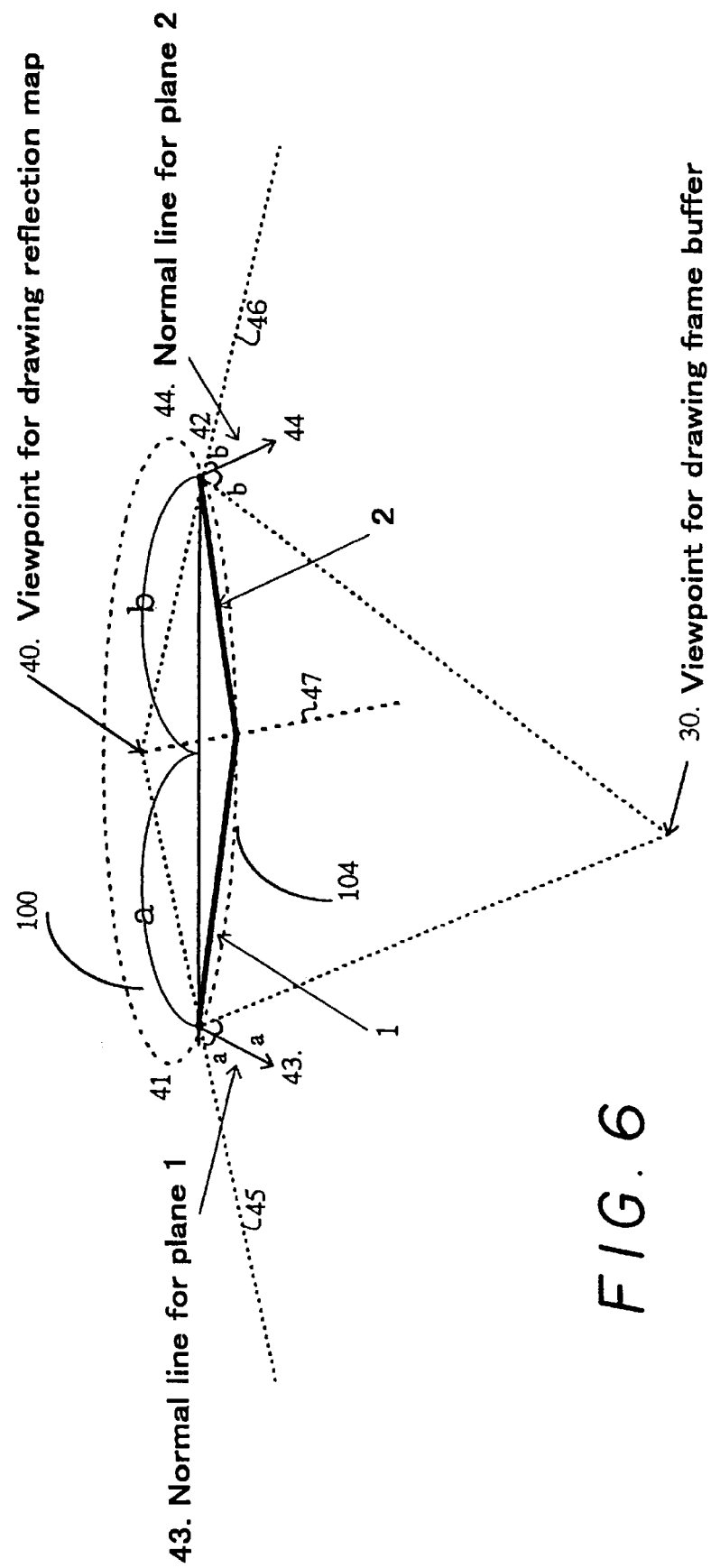
FIG. 6 is a diagram for explaining how to form a reflection map when a reflection surface is a curved surface.

FIG. 6 is a top view corresponding to FIG. 2 in that case. The building 100 is columnar and the reflection surface polygon 104 has a curved surface. In this case, the curved reflection surface polygon 104 is divided to a plurality of planes, for example, reflection surfaces 1 and 2. Then, a reflection line 45 which is symmetrical to the line extending from the viewpoint 30 for drawing (writing) data in the frame buffer memory with respect to a normal line 43 at the left end 41 of the reflection surface 1 is obtained. Likewise, a reflection line 46 which is symmetrical to the line extending from the viewpoint 30 with respect to a normal line 44 at the right end 42 of the reflection surface 1 is obtained. The intersection, 40, between both reflection lines 45 and 46 becomes a viewpoint for drawing (writing) data in the reflection map.

Figure 7:
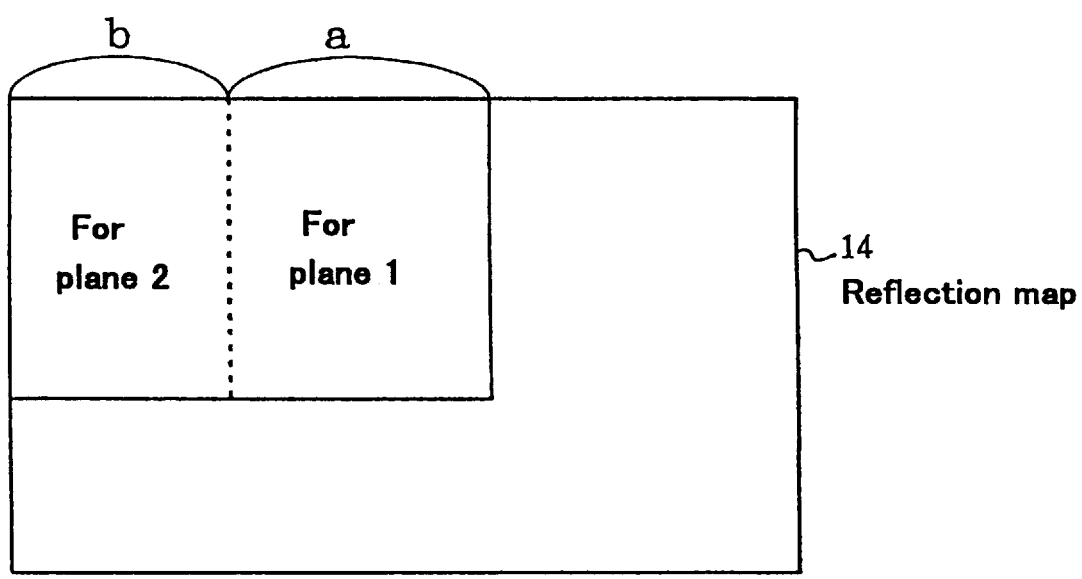
FIG. 7 is a diagram conceptually showing an example of the reflection map in the case of FIG. 6.

Therefore, data writing in the reflection map 14 for the reflection surface 1 is performed in accordance with the viewpoint 40 and the above-described processing flow, and data writing in the reflection map 14 for the reflection surface 2 is performed in accordance with the viewpoint 40. As a result, the map area for the reflection surface 1 and the map area for the reflection surface 2 are formed in the reflection map 14 as illustrated in FIG. 7. In the subsequent writing in the frame buffer memory 16, data in the two areas a, b in the reflection map 14 are read and blended with texture data and the resultant data is pasted as color data for each pixel in the texture pasting circuit 10 in the process for the reflection surface polygon 104.

Although this invention has been described herein as a general image processing apparatus, it should be apparent to those skilled in the art that this invention may be adapted to a game machine.

According to this invention, as described above, image data for each reflection surface polygon is written in the frame buffer memory for each frame period, after which image data is written in the frame buffer memory in accordance with the original viewpoint using the image data in the reflection map memory. It is therefore possible to reproduce an image to be shown on the reflection surface polygon in association with the polygon or the viewpoint on the display screen, which moves in real time. What is more, this image processing can be executed without much modification of the geometry processing section and the rendering section which were conventionally used to write data in the frame buffer memory.

What is claimed is:

1. An image processing apparatus for generating image data to be displayed on a predetermined display screen, comprising:

a processor for performing a filling process of filling a polygon to generate image data based on positional information of said polygon on two-dimensional coordinates corresponding to said display screen and texture data associate with said polygon;

a frame buffer memory for the storing the image data corresponding to said display screen; and a reflection map memory for storing image data to be shown on a reflection surface in said display screen, a reflection map memory for storing image data to be shown on a reflection surface in said display screen, wherein said processor generates said image data to be shown on said reflection surface based on first viewpoint information corresponding to said reflection surface and position information of a polygon which lies in said reflection surface, stores said generated image data in said reflection map memory, and further generates said image data to be displayed on said display screen based on second viewpoint information corresponding to the display screen, positional information of a polygon which lies in said display screen, and said display screen, and said image data in said reflection map memory, wherein the second view point information is different from the first viewpoint information.

2. The image processing apparatus according to claim 1, further comprising:

a texture map memory for storing texture data of each polygon; and a blending unit for blending image data in said texture map memory with image data in said reflection map memory by a predetermined ratio, wherein in generating said image data to be displayed on said display screen, image data acquired by blending said image data in said texture map memory with said image data in said reflection map memory is used as said texture data of each polygon in said filling process.

3. An image processing apparatus for generating image data to be displayed on a predetermined display screen, comprising:

a first processor for receiving positional information and viewpoint information of a polygon and performing perspective transformation of said positional information of said polygon to two-dimensional coordinates from three-dimensional coordinates to generate positional information of said polygon on two-dimensional coordinates corresponding to said display screen;

a second processor for receiving said generated positional information of said polygon and texture data associated with said polygon from said first processor and performing a filling process of filling said polygon to generate said image data;

a frame buffer memory for storing said image data corresponding to said display screen;

a reflection map memory for storing image data to be shown on a reflection surface of said polygon;

a texture map memory for storing image data corresponding to said texture data of said polygon; and a control unit for generating polygon information including at least said positional information and said texture data, and viewpoint information in accordance with a computer program, causing said first and second processors to generate said image data to be shown on said reflection surface in accordance with first viewpoint information associated with said reflection surface, said polygon information and said image data from said texture map memory and to store that generated image data in said reflection map memory, and causing said first and second processors to generate said image data to be displayed on said display screen in accordance with second viewpoint information associated with said display screen, said polygon information and said image data from said reflection map memory and said texture map memory and to store that generated image data in said frame buffer memory.

4. The image processing apparatus according to claim 3, further comprising:

a blending unit for blending image data in said texture map memory with image data in said reflection map memory by a predetermined ratio; and wherein in generating said image data to be displayed on said display screen, said control unit uses image data, acquired by blending said image data in said texture map memory with said image data in said reflection map memory in accordance with a degree of reflection of said reflection surface, as said texture data of each polygon in said filling process.

5. The image processing apparatus according to claim 3, further comprising:

a selector for properly switching between transfer of image data output from said second processor to said frame buffer memory and transfer of said image data to said reflection map memory.

6. An image processing method of generating image data to be displayed on a predetermined display screen, comprising:

a first step of performing perspective transformation of polygon positional information of a polygon to be shown on a reflection surface of a polygon to two-dimensional coordinates from three-dimensional coordinates based on said polygon positional information and first viewpoint information with respect to said reflection surface to generate polygon positional information of the polygon on two-dimensional coordinates corresponding to said reflection surface;

a second step of performing a first filling process of filling said polygon, based on said polygon positional information generated in said first step and texture data associated with said polygon, to generate image data to be shown on said reflection surface;

a third step of writing image data to be shown on said reflection surface in a reflection map memory;

a fourth step of performing perspective transformation of polygon positional information of the polygon to be displayed on the display screen to two-dimensional coordinates from three-dimensional coordinates, based on that polygon positional information and second viewpoint information with respect to said display screen, to generate polygon positional information of a polygon on two-dimensional coordinates corresponding to said display screen;

a fifth step of performing a process of second filling said polygon, based on said polygon positional information generated in said fourth step and image data of an area corresponding to said reflection surface in said reflection map memory, to generate the image data to be displayed on said display screen; and a sixth step of writing said image data to be displayed on said display screen, generated in said fifth step, in a frame buffer memory.

7. The image processing method according to claim 6, wherein in generating said image data to be displayed on said display screen in said fifth step, image data acquired by blending image data in a texture map memory with said image data in said reflection map memory is used as said texture data of each polygon in said second filling process.

8. The image processing method according to claim 7, wherein in generating said image data to be displayed on said display screen in said fifth step, image data acquired by blending said image data in said texture map memory with said image data in said reflection map memory in accordance with a degree of reflection of said reflection surface is used as said texture data of each polygon in said second filling process.

9. The image processing method according to claim 6, wherein when said reflection surface of said polygon has a curved surface, said curved surface is divided to a plurality of flat reflection surfaces, image data of said polygon to be shown on said flat reflection surfaces are generated in said first and second steps, and said image data on said reflection surfaces are respectively stored in different areas in said reflection map memory.

* * * * *